United States Patent [19]
Barth

[11] Patent Number: 5,780,748
[45] Date of Patent: Jul. 14, 1998

[54] FLOW DEVICE HAVING PARALLEL FLOW SURFACES WHICH MOVE TOWARD AND AWAY FROM ONE ANOTHER TO ADJUST THE FLOW CHANNEL IN PROPORTION TO APPLIED FORCE

[75] Inventor: Phillip W. Barth, Portola Valley, Calif.

[73] Assignee: Hewlett-Packard Company, Palo Alto, Calif.

[21] Appl. No.: 790,687

[22] Filed: Jan. 29, 1997

[51] Int. Cl.$^6$ .............................. G01F 1/38; G05D 11/00
[52] U.S. Cl. ............................................ 73/861.47; 137/98
[58] Field of Search .......................... 137/15, 98, 116.5, 137/504, 517, 831; 251/11, 205; 357/26; 436/161; 91/446; 73/861.47, 861.48

[56] References Cited

U.S. PATENT DOCUMENTS

| | | | |
|---|---|---|---|
| 4,383,550 | 5/1983 | Sotokazu | 137/517 |
| 4,474,889 | 10/1984 | Terry et al. | 436/161 |
| 4,581,624 | 4/1986 | O'Connor | 357/26 |
| 4,682,531 | 7/1987 | Mayer | 91/446 |
| 4,858,644 | 8/1989 | Decker | 137/504 |
| 4,869,282 | 9/1989 | Sittler et al. | 137/15 |
| 4,972,868 | 11/1990 | Davis et al. | 137/116.5 |
| 4,977,919 | 12/1990 | Field | 251/205 |
| 5,058,856 | 10/1991 | Gordon et al. | 251/11 |
| 5,163,920 | 11/1992 | Olive | 604/247 |

OTHER PUBLICATIONS

Bousse et al., "High–Density Arrays of Valves and Interconnects For Liquid Switching" Solid–State Sensor and Actuator Workshop, Hilton Head, S. Carolina, Jun. 2–6, 1996, pp. 272–275.

Jarman, Hal, "Electrically Activated, Micromachined Diaphragm Valves" CH2783–9/90/0000–0065, IEEE (no date).

Streeter et al., "Viscous Flow: Pipes and Channels" *Fluid Mechanics*, 8th ed., McGraw–Hill Publishing Co., New York, 1985, pp. 185–242 (no month).

Angell et al., "Silicon Micromechanical Devices" pp. 44–138 (no date).

*Primary Examiner*—William L. Oen
*Attorney, Agent, or Firm*—Marc P. Schuyler

[57] ABSTRACT

This disclosure provides a novel flow device having a fourth root pressure versus flow characteristic. The flow device includes an inlet, an orifice that focusses fluid pressure, a pair of parallel plates (or other surfaces which can be modeled as parallel plates), and an outlet. Preferably, the pair of parallel plates are a pair of two flat disks, one of which has a central aperture. When the device is used as a flow restrictor, the central aperture forms a seat against which the second plate (the impeder plate) is biased to restrict fluid flow. The orifice provides fluid pressure through the aperture, which forces the second plate away from the first plate, and against the bias. Fluid flow through the plates is directly proportional to displacement between the plates, and spent fluid escapes via a radial periphery of the second plate. Preferably, the second plate is mounted to a housing by a set of springs which also contain a strain gauge, such that displacement can be electronically measured. The flow restrictor of the present invention is expected to have particular application in the fields of biological and chemical analysis instruments.

19 Claims, 8 Drawing Sheets

FLOW DEVICE HAVING PARALLEL FLOW SURFACES WHICH MOVE TOWARD AND AWAY FROM ONE ANOTHER TO ADJUST THE FLOW CHANNEL IN PROPORTION TO APPLIED FORCE

The present invention relates to a flow device and, in particular, a flow restrictor having a fourth root pressure versus flow characteristic in liquid flows, and a fifth root pressure versus flow characteristic in gas flows. The device provides for a small change in pressure or displacement over a wide dynamic range of flow, and is useful for flow measurement and control purposes.

BACKGROUND

Much of today's chemical and biological analysis equipment relies upon precise, accurate determination of, or control over, flow rate. Examples of such equipment include liquid and gas chromatography, capillary electrophoresis, and capillary electrochromatography equipment. However, existing flow devices relied upon by these devices to determine or control flow rate, such as pressure devices and flow meters, are generally inadequate for many modern day applications of the equipment.

For example, pressure-based flow devices, such as capillaries or venturis with associated pressure measurement, typically often exhibit insufficient dynamic range for chemical and biological analysis applications. Many, perhaps most, of these devices presently in use provide only a linear relationship between flow and pressure. Since modern day chemical and biological analysis equipment can require flow rates which vary between 0.001 to 10 milliliters per minute (corresponding to a dynamic range of 10,000), and since the cost of pressure sensors becomes prohibitive for sensors which are required to exhibit a dynamic range over 1,000, it typically is not practical to use highly-sensitive pressure-based flow devices which respond adequately to small variations in flow rate.

As an alternative to performing a flow measurement, flow may be metered instead of measured, by using a metering pump such as a screw-driven syringe. Precision metering pumps can provide a wider dynamic range than other flow measurement devices, but metering pumps are relatively expensive and are generally susceptible to seal wear and leakage, and so require frequent maintenance. Metering pumps have their own associated dynamic range limitations typically ranging from 1,000 to 10,000 depending on cost, wear, and leakage, but the increased maintenance requirements associated with such devices frequently renders them also impractical for modern day chemical and biological analysis applications.

There exists a definite need for a practical, low-cost flow device which has a relatively high dynamic range. Preferably, such a device should be particularly sensitive to the wide range of flow rates used by chemical and biological analysis equipment. Further, such a device should be relatively maintenance free, resistant to effects of corrosive liquids, and readily usable with a wide variety of equipment and applications. A need also exists for a flow measurement device which is small, contributing to the fabrication and reliability of small, compact analysis equipment. Additionally, a flow device which blocks flow in one direction while providing a well-controlled flow versus pressure characteristic in the opposite direction should be desirable in some applications. The present invention satisfies these needs and provides further, related advantages.

SUMMARY OF THE INVENTION

The present invention provides a flow device which solves the aforementioned needs. In particular, it provides a pressure drop in liquids that is roughly proportional to the fourth root of flow rate; the present invention thus can be used to measure flow over a very large dynamic range. In the example mentioned above (with flow rate variation over a factor of 10,000), a device having a fourth root pressure versus flow characteristic results in pressure varying by a factor of ten, allowing the use of an inexpensive pressure sensor to monitor the pressure drop across a very significant range of flow rates. Such a pressure sensor provides an electronic output that can readily be combined with other electronic components or sensors, for example, a viscosity sensor, to obtain independence from fluid properties. The present invention provides a very low cost device, e.g., which can be made out of silicon-based parts, which should find significant application, both within the fields of chemical and biological analysis, and within other fields as well.

One form of the present invention provides a flow restrictor having a fluid inlet, an outlet, and two substantially parallel plates in close proximity to one another which define a fluid flow channel. An orifice receives fluid from the inlet and directs it in a manner to displace the plates with respect to one another, and thus deepen the fluid flow channel in response to increased pressure.

The plates are preferably made to be two disks, with the orifice directing flow through the middle of one of the disks to push the other disk away. In this configuration, the fluid flow channel is perpendicular to fluid directed against the second plate by the orifice, and fluid escapes around a periphery of the displaced, second disk. The displaced disk is biased by spring-arms to normally lie against the first disk, and thus close the channel and block flow. It also thereby can be used to provide a fluid check valve which blocks flow in the reverse direction.

Importantly, the present invention can be used to provide a fourth-root relation between the rate of liquid flow and a measured parameter, such as pressure drop (as noted above) or spring displacement, as will be discussed further below. Additionally, if used with a gas medium (also a "fluid," as used herein) instead of a liquid medium, the present invention will provide a fifth-root relationship between the rate of fluid flow and a measured parameter such as pressure or displacement. The fifth-root relationship arises because gas is compressible, while liquids are substantially incompressible.

The invention may be better understood by referring to the following detailed description, which should be read in conjunction with the accompanying drawings. The detailed description of particular preferred embodiments, set out below to enable one to build and use particular implementations of the invention, is not intended to limit the enumerated claims, but to serve as particular examples thereof.

BRIEF DESCRIPTION OF THE DRAWINGS

FIG. 3 is used to explain the operation of the flow device in its preferred embodiments.

FIG. 4 shows a finished assembly of an upper plate member (the orifice plate), a lower plate member (the impeder plate), and two housing halves which hold the orifice plate and the impeder plate together.

DETAILED DESCRIPTION

The invention summarized above and defined by the enumerated claims may be better understood by referring to the following detailed description, which should be read in conjunction with the accompanying drawings. These detailed description of particular preferred embodiments, set out below to enable one to build and use particular implementations of the invention, are not intended to limit the enumerated claims, but to serve as particular examples thereof.

In accordance with the principles of the invention, a first preferred embodiment is a flow device 101 which incorporates two parallel plate surfaces 103 and 105, or a structure which can be modeled as two parallel plates, to provide an extremely large dynamic range in flow measurement or control. The principles of operation of the device will be explained with reference to FIGS. 1–3, while FIGS. 4–8 are used to explain a first preferred embodiment, namely, a conventionally-machined flow restrictor; FIGS. 9–15 show alternative implementations of the flow restrictor.

Figure 1:
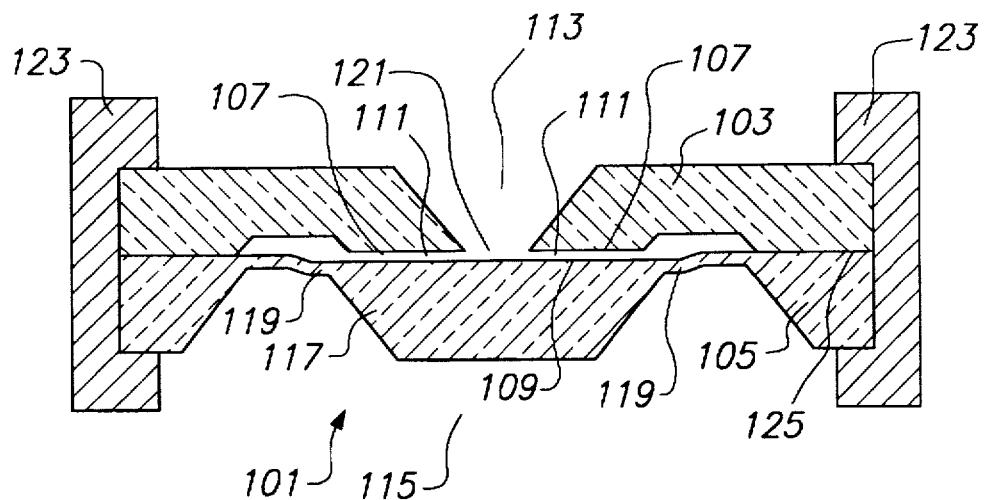
FIG. 1 is an axial cross-section of a flow device that implements the principles of the present invention.
Figure 2:
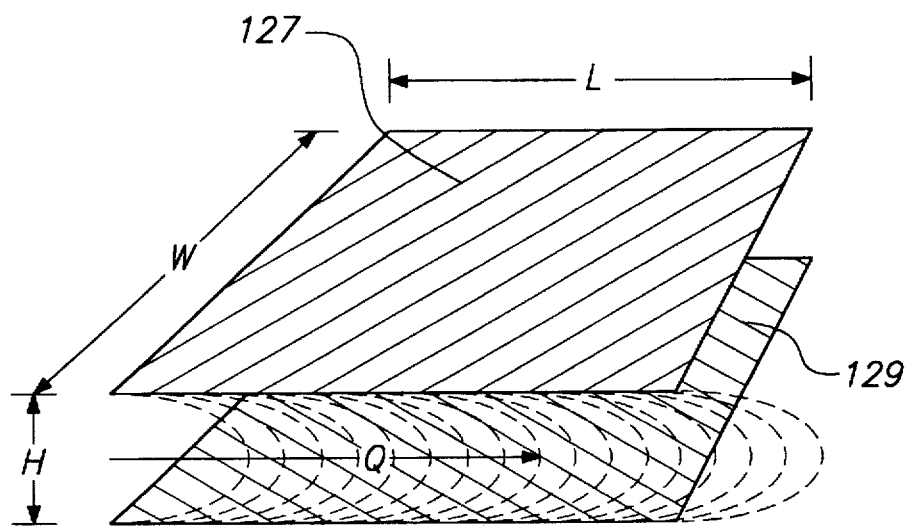
FIG. 2 is an illustrative diagram showing two parallel plates, and is used to explain one operating principle of the present invention.
Figure 3:
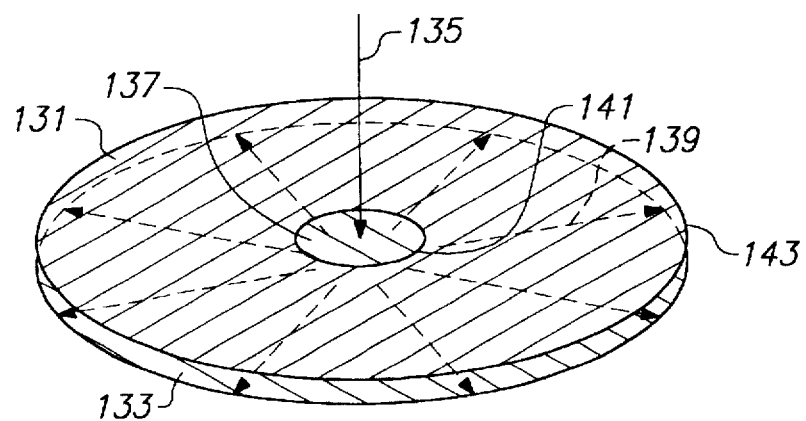
FIG. 3 is an illustrative diagram similar to FIG. 2, but in which two parallel plates are seen to be two circular disks.

As seen in FIGS. 1–3, a first plate 103, referred to as the orifice plate, is placed in close proximity to a second parallel plate 105, referred to as the impeder plate. Central contacting portions 107 and 109 of the two plates define a lateral flow channel 111 between them, and connect together an inlet 113 and an outlet 115. A relatively thick central body 117 of the impeder plate, referred to as the impeder block, is suspended around its periphery by multiple springs 119, which are stiff in the lateral directions while allowing significant motion in the vertical direction. A hydraulic fluid, liquid or gas, enters the device via the inlet 113, and then flows through an orifice 121 into the lateral flow channel 111. As permitted by vertical displacement between the central contacting portions 107 and 109, fluid flows laterally between them, and then downward through holes (not shown in FIGS. 1–3) between springs 119 and toward the outlet 115. A housing 123 maintains intimate contact between the peripheral areas 125 of the plates 103 and 105.

Fluid flow between inlet 113 and outlet 115 cause a pressure drop which preferably occurs substantially in the lateral flow channel 111, but to only a small extent elsewhere in the flow device 101. Typically, displacement between surfaces 107 and 109 is less than 25 micrometers throughout the desired range of flow, so that the lateral channel has a high fluid resistance in comparison to fluid resistances elsewhere in the flow device. In accordance with the present invention, it is desired to have a pressure drop which changes a small amount in response to large fractional changes in the flow rate. This objective is preferably accomplished through the presence of springs 119, which allow the impeder block 117 to move vertically away from the orifice plate surface 107 and so decrease the flow resistance of lateral channel 111. Thus, whether the device 101 is being utilized as a valve or as a flow restrictor (in connection with a measurement device to measure flow), pressure drop across the device in the free-flowing direction does not vary over a large dynamic range in comparison to alternative flow restricting devices, such as capillaries, venturis, or simple orifices.

Pressure drop in the device 101 is further explained with reference to FIGS. 2 and 3, and use of a liquid as the fluid medium will be assumed. In particular, FIG. 2 illustrates a parallel plate arrangement in which width "W" is assumed to be large in relation to either length "L" or gap height "H" (the gap height is the displacement between two parallel plates 127 and 129). In the configuration illustrated in FIG. 2, the Navier-Stokes equations for fluid flow have a solution for a laminar liquid flow of flow rate "Q," given dimensions for the gap between the parallel plates of height, width and length "H," "W" and "L," pressure drop "Δp," and liquid viscosity "μ," which is substantially as set-forth below:

$$Q = \frac{WH^3 \Delta P}{12 \mu L}.$$

Parallel plates 127 and 129 of FIG. 2 (or structures which can be modeled as parallel plates), when varied in their relative displacement, result in a variation in fluid resistance through the channel. As the plates 127 and 129 are moved together or apart while pressure drop is held constant, the flow through the device decreases or increases in a manner proportional to the third power of the change in gap height. As is described below, the preferred embodiments utilize a variable gap height which is linearly proportional to the pressure drop, such that flow rate is proportional to the fourth power of the pressure drop.

The equation of a spring is given by the simple equation F=–$K_{spring}$ X, where "F" is force exerted on the spring, "X" is the displacement of the spring due to the applied force, and "$K_{spring}$," is a constant of proportionality defined as the spring rate. For the case of liquid flow where the plates as shown in FIG. 2 are held together by a spring with a spring rate "$K_{spring}$," the spring displacement "X" is the same as the gap height "H," and the force attempting to separate the plates is given by the area of the plates multiplied by the average of the pressure between the plates, as set forth below.

$$F = -K_{spring}H = WL\frac{\Delta P}{2}$$

In the equation seen above, the gap "H" is linearly proportional to the pressure drop "$\Delta P$," and as a result the flow "Q" is proportional to the fourth power of the pressure drop as set forth below:

$$Q = \frac{W}{12\mu L}\left(\frac{WL}{-K_{spring}}\right)^3 \left(\frac{\Delta P}{2}\right) \Delta P.$$

The geometry of the device shown in FIG. 1 is different from the simple geometry shown in FIG. 2 because, in the device of FIG. 1, the fluid spreads radially outward from the central orifice 121. The geometry of the device of FIG. 1 can be modeled as shown in FIG. 3.

As shown in FIG. 3, parallel plates are preferably configured to be circular disks 131 and 133, the upper one 131 of which has an aperture 137 in its center. Liquid flow 135 enters the central aperture 137 in the upper disk 131 and flows through the aperture toward the second, lower disk (or plate) 133. As it impinges against the lower disk 133, it is forced to move laterally and divergently, to become a radially outward flow 139. The flow 135 exerts a downward momentum force in the area of aperture 137; this force, however, is preferably made insubstantial by appropriate area scaling in relation to the pressure force exerted by the fluid against the area of the lower disk 133, both in the central aperture area 137 and in the area of lateral flow 139 between an inner radius 141 (corresponding to the aperture) and the radius 143 of the second lower disk 133 (the outer radius). The lower disk 133 is preferably supported by springs (not shown in FIG. 3), so that the total force exerted by the fluid acts against the second disk 133 pushes it away from the first disk 131. Increasing the force exerted upon the second disk 133 increases the gap in the parallel plate arrangement and so increases the flow between plates. As indicated by FIG. 3, fluid escapes by flowing radially, away from the aperture 137, toward the periphery and, then, outward and downward in a manner which is substantially unrestricted.

The flow rate in this configuration is given by $$Q = C\frac{\Delta P^4}{\mu K_{spring}^3},$$

where C is a geometrical constant. It can be seen that this equation gives, in the case of the simplified embodiment of FIG. 3, a fourth-power relationship between applied pressure and resulting flow. The geometrical constant C is given by the following equation:

$$C = \frac{-\pi^4}{48} \frac{\left(4R_{out}^2 \cdot \ln\left(\frac{R_{out}}{R_{in}}\right) - 2R_{in}^2 \cdot \ln\left(\frac{R_{out}}{R_{in}}\right) - R_{out}^2 + R_{in}^2\right)}{\ln\left(\frac{R_{out}}{R_{in}}\right)^4}.$$

$R_{out}$ corresponds to the outer radius 143 of the lower disk 133 of FIG. 3, while $R_{in}$ corresponds to the inner radius 141, i.e., the radius of the aperture 137 of FIG. 3. The above solution for the geometrical constant "C" allows a designer to construct a flow device scaled to specific flow and pressure requirements. It can also be shown that the flow "Q" is proportional to the fourth power of the gap height between the two disks 131 and 133. The radial geometry displayed in FIG. 3 and discussed above is the preferred geometry for the device displayed in FIG. 1.

It should be noted that the desired fourth root relationship between flow and pressure can extend over several decades of flow. At the high end of the flow range, large flows result in a Bernoulli effect phenomenon which tends to suck the two parallel flow surfaces toward one another, so that gap decreases and pressure increases radically with further flow increases, causing a departure from the desired fourth root characteristic. At the low end of the flow range, tolerances on the fabrication of the device suggest that there is either an initial gap present between the plates, or an initial closing force present if the plates are in contact. If an initial gap is present, the pressure drop is less than the desired fourth root characteristic for low flow. If an initial closing force is present, pressure drop is greater than the desired fourth root characteristic for low flow. Between the two extremes due to gap tolerance and the Bernoulli effect, the desired fourth root characteristic is obtained for pressure and also for gap height.

Figure 5:
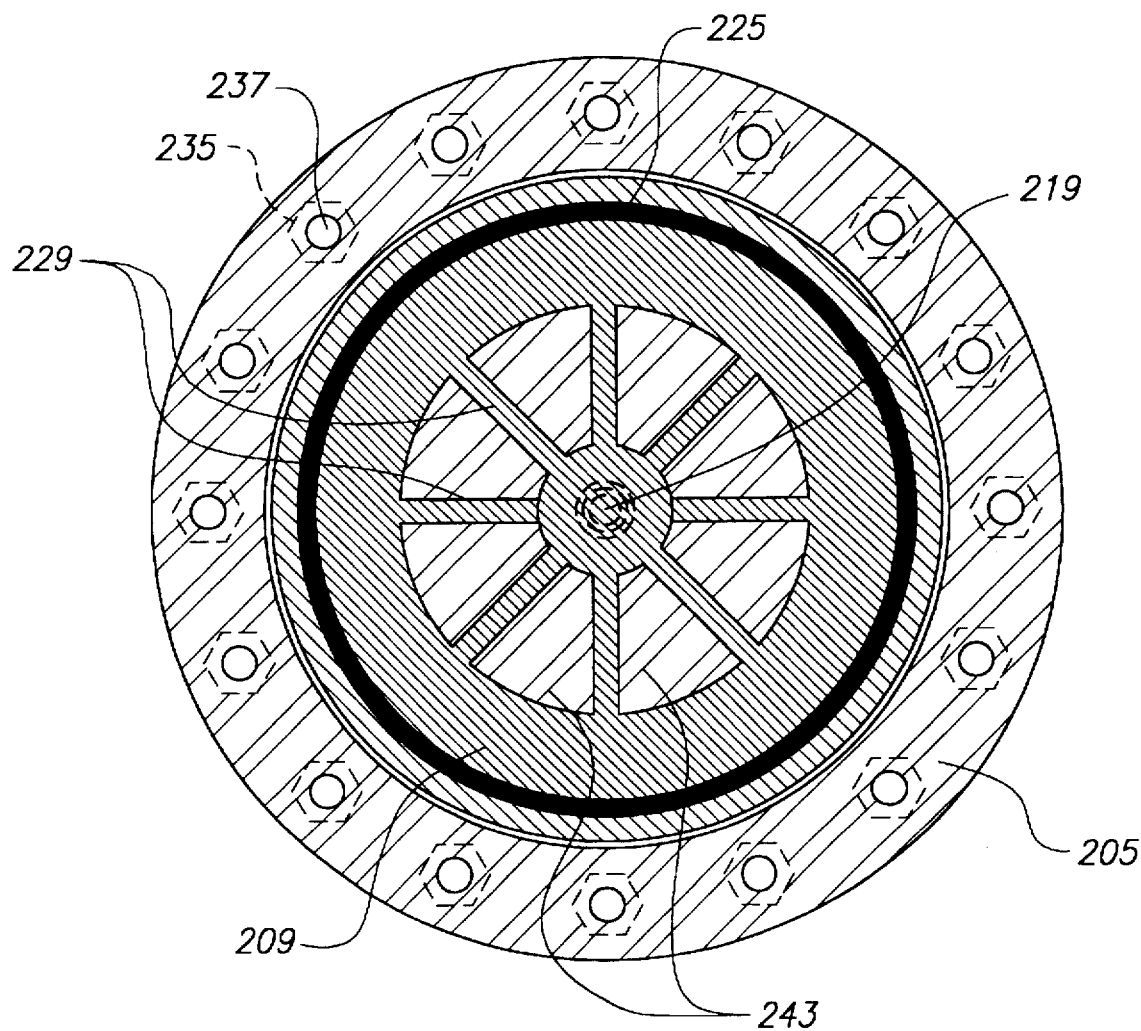
FIG. 5 is a plan view of the impeder plate of FIG. 4, resting within the lower housing half and surmounted by an o-ring seal.
Figure 4:
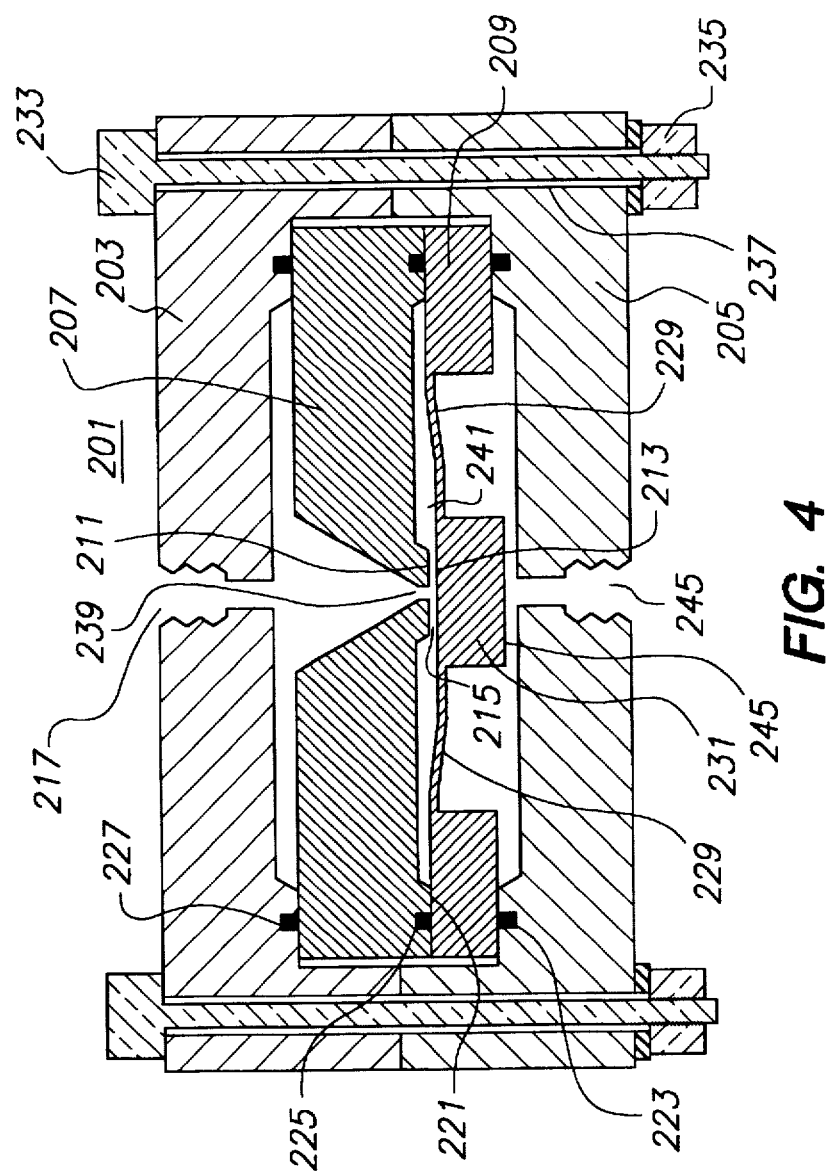
FIG. 4 is an axial cross-section of a first preferred embodiment which is constructed using conventional machining techniques; in particular.
Figure 6:
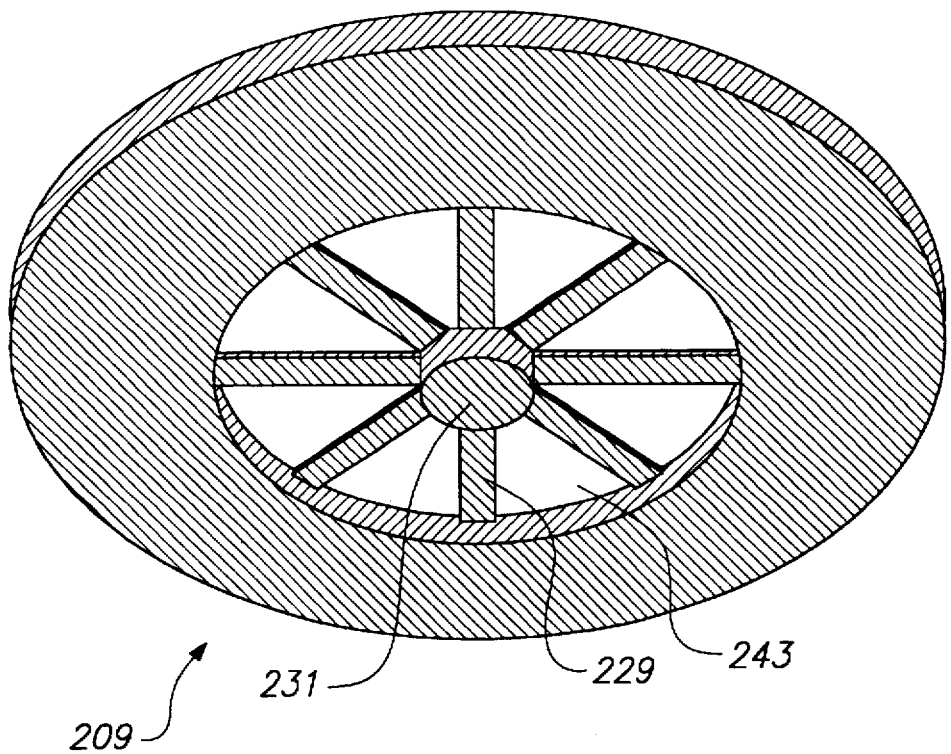
FIG. 6 is a perspective view of the lower side of the impeder plate of FIG. 5.

FIGS. 4–7 illustrate the configuration of a first preferred embodiment of flow device 201 of the present invention, namely, a flow restrictor that can be fabricated using conventional machining techniques. The assembled flow restrictor 201 is seen in FIG. 4 in a cross-sectional view, in which the vertical dimensions are exaggerated for display purposes. The device 201 includes two identical housing halves 203 and 205, an orifice plate 207, and impeder plate 209. Preferably, all of the housing halves 203 and 205 and the two plates 207 and 209 are formed of stainless steel, to avoid corrosion by the flowing fluid. By way of example, a typical diameter of the outer dimension of the impeder plate in FIG. 6 is 10 cm.

The device is held together by means of a large number of bolts 233 and nuts 235, which connect the housing halves together through peripheral bores 237 and which mount the orifice and impeder plates so as to normally contact one another around their peripheries 221. The bolts and nuts cooperate with a series gaskets to maintain a relatively reliable and leak-free device. In particular, three circular gaskets 223, 225 and 227 are employed to prevent any leakage, (a) at the interface between the orifice plate 207 and one half 203 of the housing, (b) between the impeder plate 209 and a second half 205 of the housing, and (c) between the two plates 207 and 209 themselves, near their peripheries 221.

The orifice and impeder plates 207 and 209 centrally mount the first and second disk-shaped plate surfaces 211 and 213, in parallel, and thereby create a radial flow channel 215. Screw-threaded inlet and outlet channels 217 and 219 provide a mechanism for attaching the flow restrictor 201 to external flow paths (not shown) for delivering hydraulic fluid to and from the restrictor.

In FIG. 4 the central surface areas 211 and 213 are displayed as non-contacting, as is the case when a fluid flows through the flow device 201. When the flow through the device is reduced to zero, peripheral springs 229 relax upward, and the impeder block 231 rises to bring the central, parallel plate surfaces 211 and 213 into contact, thereby reducing the height of flow channel 215 to zero. The springs are shown in their relaxed flat state in FIG. 6.

Flow enters the device through inlet 217, flows downward through a central orifice 239 and, then, moves laterally through radial channel 215. At the periphery of the radial channel, the fluid then passes through a plenum region 241, where the flow turns downward through holes 243 between springs 229, and the fluid exits the device through the outlet 219. Preferably, the bottom surface 245 of impeder block 231 never approaches contact with the upper surface of housing half 205, so that there is no flow restriction near the outlet.

Figure 7:
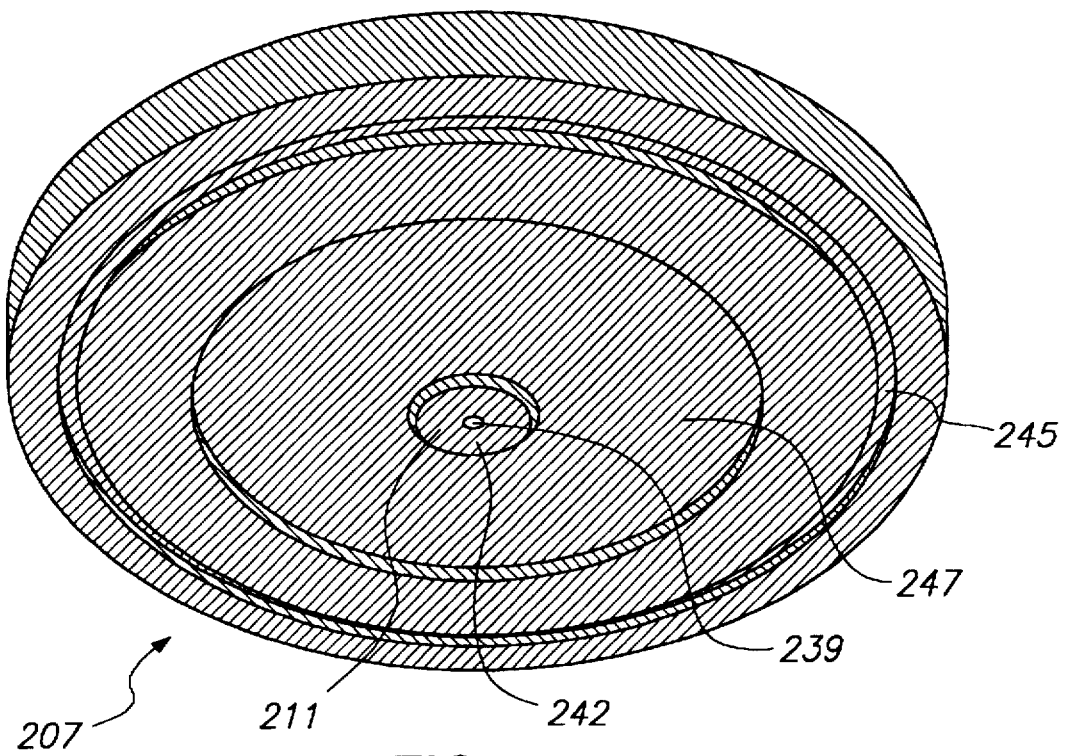
FIG. 7 is a perspective view of the lower side of the orifice plate of FIG. 4.

FIG. 5 provides a plan view looking at the top surface of the impeder plate 209 resting within the lower housing half 205, while FIG. 6 presents a perspective view of the bottom side of the impeder plate. FIG. 7 displays the bottom surface of the orifice plate 207 and indicates the presence of an "O"-ring locating groove (gland) 245 and a recessed area 247, which cooperate to define the upper surface of plenum region 241.

Flat, wet surfaces when placed in contact tend to stick together, and such sticking constitutes a potential problem in the operation of the flow device. Advantageously, either or both of surfaces 211 and 213 may be decorated with standoff bumps in order to prevent such sticking from being a problem. Such bumps can be on the order of one micrometer or less in height, and are indicated in location in FIG. 7 by the reference numeral 242, but are too small to display on the scale of FIG. 7.

Figure 8:
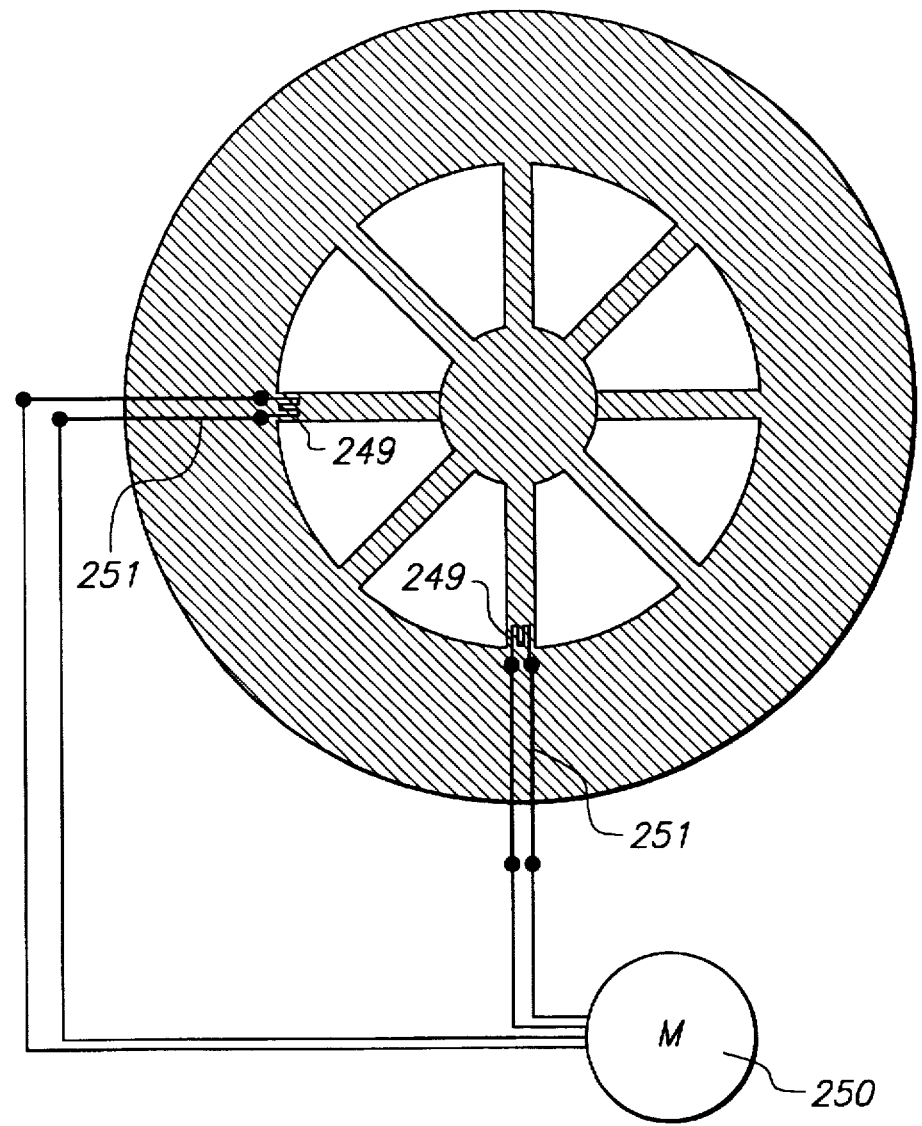
FIG. 8 is a plan view of an impeder plate similar to that seen in FIG. 5, but to which strain sensing elements have also been attached.

FIG. 8 displays a plan view of the top surface of an impeder plate to which strain sensors 249 have been added; preferably, these sensors may be connected to an external measurement device 250, for example, a pressure or flow rate indicator. The strain sensors may be bonded-on wire or foil strain gauges, or may be thin or thick film regions which require both the presence an underlying insulating layer (not shown) and the use of a patterning technique such a screening or lithography. Insulated leads 251 provide electrical contact to the strain sensors. The particular pattern of the strain sensors 249 and the associated leads 251 is not important to the present invention, and one possessing ordinary skill in the art would readily be capable of implementing a strain gauge appropriate to measure displacement. Importantly, the strain sensors 249 are insulated by a covering layer of insulator (not shown), to avoid contact with the liquid.

The strain sensors 249 permit monitoring of the amount of displacement of the springs 229, via sensing of the stain in the springs using well known electronic instrumentation. In a manner similar to the fourth-power relationship between pressure and flow, flow varies as the fourth power of the spring displacement in the case of a liquid fluid. Monitoring the spring displacement thus permits sensing of flow over a wide dynamic range without the need for a separate pressure sensor. Preferably, use of either a separate pressure sensor or of strain gauges, and an electronic output 251 of the restrictor, provides for electronic compatibility with other measuring equipment, for example, a viscosity sensor.

Figure 9:
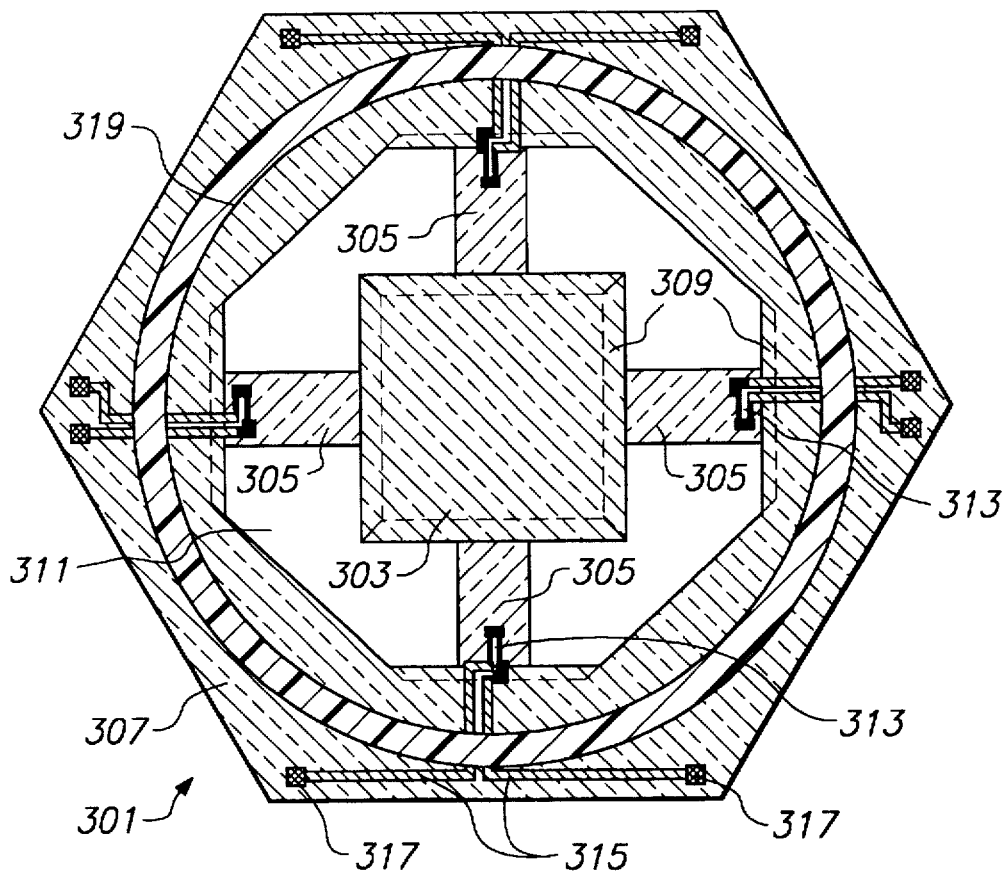
FIG. 9 is a plan diagram of an impeder plate in a second preferred embodiment, namely, an impeder plate which is fabricated using silicon micromachining techniques; strain sensing elements are also seen as included in the impeder plate of FIG. 9.
Figure 10:
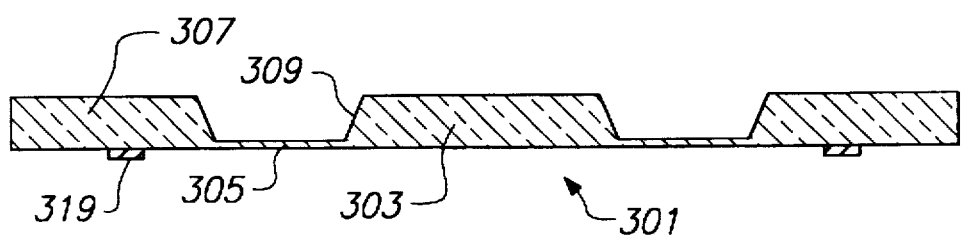
FIG. 10 is a cross-sectional view of the impeder plate shown in FIG. 9

FIGS. 9 and 10 display a detail of second preferred embodiment of the present invention, namely, a device having an impeder plate 301 in which the substrate is formed of a semiconductor material, such as silicon. By way of example, a typical largest dimension of the impeder plate shown in FIG. 9 is 1.4 cm. The view presented by FIG. 9 is of the lower surface of the impeder plate 301, that is, it is a view of the side of the plate not in contact with the orifice plate in this second preferred embodiment. FIG. 10 presents a cross-sectional view of the impeder plate 301.

As seen in FIGS. 9 and 10, the impeder block 303 is supported by spring members 305, which are in turn supported by frame area 307. Impeder block 303, springs 305, and frame 307, are preferably made from a unitary block of single-crystal semiconductor material with features being formed by an etching process. Dotted lines in FIG. 9 indicate sloping sidewalls 309 of the impeder block 303. Such walls can be fabricated by etching of the semiconductor material (e.g., by etching silicon in a caustic etchant, such as potassium hydroxide in water) in a manner well known in the art. Holes 311 between springs 305 can be fabricated by any of several well-known means, such as caustic etching or vapor phase etching.

In the second embodiment, the strain sensors 313 are preferably silicon piezoresistive elements, which have higher sensitivity than the strain sensors discussed in conjunction with FIG. 8, above. Such piezoresistive strain sensors and their fabrication are well known. In forming an electrical connection between the strain sensors 313 and external electrical devices, leads 315 are also deposited to connect the sensors to bonding pads 317, which are located beneath a sealing ring 319. A suitable manner of fabricating the leads 315, bonding pads 317, and sealing ring 319 are set forth in U.S. Pat. No. 5,581,028, "Fluid property Sensors Incorporating Plated Metal Rings for Improved Packaging," which is incorporated herein by reference.

Importantly, the semiconductor impeder plate shown in FIG. 9 presents certain performance advantages over the conventionally machined impeder plate discussed in reference to FIGS. 4–8. It is easier to reliably fabricate a well-controlled initial gap between a small silicon impeder block and a small silicon orifice plate than can be fabricated using relatively large pieces of metal and conventional machining processes. The width, length and thickness of the springs 305 can be controlled to tolerances on the order of a micrometer, using photolithography and etching techniques for the length and width, and using a chemical etching process to impart desired spring thickness. This end is preferably accomplished using an etch stop layer, such as heavy doping of a buried layer with a combination of boron and germanium, or an insulator, which has been incorporated into the silicon before etching occurs. Such techniques are well known in the fabrication of silicon wafers and in the fabrication of etched layers of controlled thickness.

In contrast to the precise dimensional control available for a semiconductor implementation, dimensional tolerances for the stainless steel part configuration shown in FIGS. 4–8 are on the order of 10 micrometers. In contrast to the precise dimensional control available for a semiconductor implementation such as that of FIG. 9, dimensional tolerances for the implementation shown in FIGS. 4–8 are on the order of 10 micrometers unless considerable care and expense are used.

Figure 11:
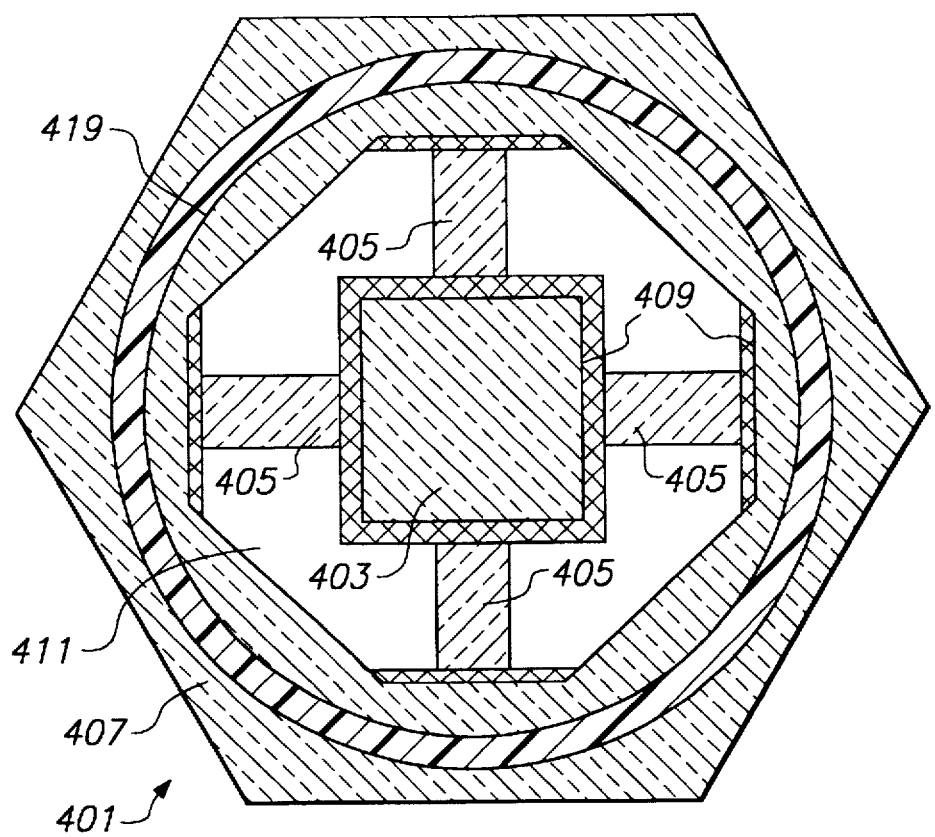
FIG. 11 is a plan diagram of an impeder plate similar to the impeder plate shown in FIG. 9, but not having strain sensing elements.
Figure 12:
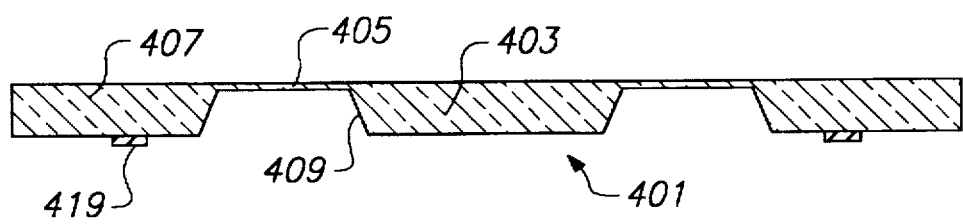
FIG. 12 is a cross-sectional view of the impeder plate shown in FIG. 11

FIGS. 11 and 12 show a simplified version 401 of the impeder plate 301 shown in FIGS. 9 and 10. In the impeder plate 401 of FIGS. 11 and 12, no strain sensing elements and no associated leads are present. Other features are similar to those shown in FIGS. 9 and 10, including impeder block 403, springs 405, frame area 407, etched walls 409, holes 411, and sealing ring 419. However, in contrast to the etched walls 309 of FIG. 9 (in which the etched walls are on a side of the impeder plate opposite the point of view), the etched walls 409 of FIG. 11 are indicated on the same side as the point of view.

Figure 13:
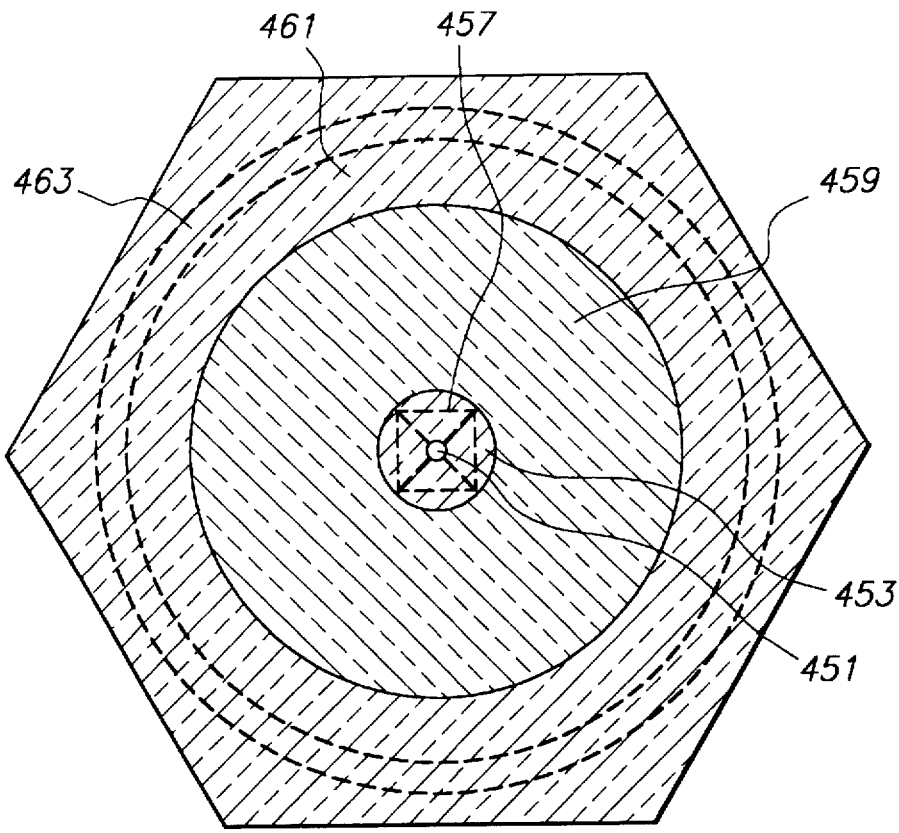
FIG. 13 is a plan diagram of the lower side of an orifice plate, which can be used in conjunction with the impeder plates illustrated in FIGS. 9–12.
Figure 14:
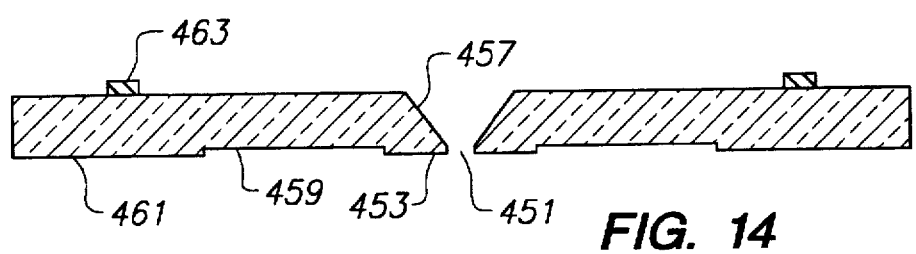
FIG. 14 is a cross-sectional view of the orifice plate shown in FIG. 13.

FIGS. 13 and 14 display an orifice plate suitable for use with the impeder plates shown in FIGS. 9–12. A central orifice 451 is surrounded by flat, parallel plate flow area 453. The radius of the orifice 451 defines an inner radius of the flow area, such was discussed above in connection with FIG. 3, while an outer radius of the area defines an outer radius of a flow area. A radially concentric outer area, i.e., the plenum region 459, is somewhat recessed as compared to flat plate area 453, while an outer frame area 461 is on the same level as is the flow area 453. As with the embodiments mentioned above, a sealing ring 463 is provided to prevent leaks. It should be appreciated that sealing rings 319 and 463 may optionally be replaced by conventional "O"-rings. Conventional "O"-rings, however, are typically of different scale than sealing rings and likely would have to be specially ordered.

Figure 15:
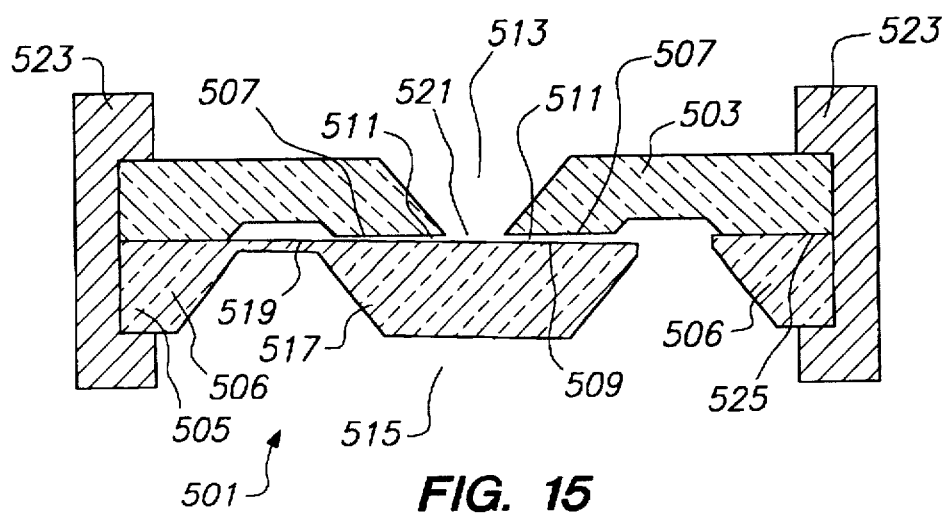
FIG. 15 is a cross-sectional view of an alternative impeder plate embodiment which incorporates a spring support on one side only, instead of peripheral springs circumferentially disposed on all sides.

FIG. 15, displays another embodiment of the present invention, namely, a flow device 501 having an orifice plate 503, an impeder plate 505, and a housing 523, which retains two plates together at their periphery 525. In the center of each plate 503 and 505, two parallel flow surfaces 507 and 509 lie in proximity when there is no flow through the device. As with the embodiments discussed above, the orifice plate 503 defines an inlet 513 which terminates in an aperture 521 in approximately the radial center of the upper flow surface 507. Together, the flow surfaces 507 and 509 define a lateral flow channel 511 with a gap height driven by the force of fluid originating at the orifice.

The lower flow surface 509 (of the impeder plate) is defined by the top surface of an impeder block 517. Unlike the embodiments mentioned above, the impeder block of the embodiment illustrated in FIG. 15 is mounted at the end of a single spring member or flap 519, which biases the block against displacement away from the upper parallel plate flow area 507. Fluid escapes from the lateral flow channel via a fluid exit area 515, around a periphery of the impeder block 517. Although the impeder block is mounted to a frame 506 (of the impeder plate) at only one end, the mounting is configured in such a manner that the impeder block is never displaced an excessive amount, and thus, justifies an assumption of parallel plate relationship if a sufficiently large spring constant is implicated.

Having thus described several exemplary embodiments of the invention, it will be apparent that various alterations, modifications, and improvements will readily occur to those skilled in the art. For example, substantially planar parallel flow surfaces are shown in the various embodiments described above; the principles discussed above, however, may also be applied to flow surfaces which are non-planar, for example, to matched convex and concave surfaces. Other variations of the embodiments described can be made without departing from the spirit of the invention described herein.

Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

I claim:
1. A flow device, comprising:
   an inlet;
   an outlet;
   substantially parallel flow surfaces which move toward and away from one another while remaining substantially parallel, a flow channel being formed between the surfaces and operatively coupling the inlet and the outlet;
   means for directing fluid from the inlet in a manner to exert a force against at least one of the flow surfaces, to displace the flow surfaces away from one another and thereby widen the flow channel in proportion to the force; and
   means for biasing the flow surfaces against displacement caused by the force of the fluid.

2. A flow device according to claim 1, wherein said device forms a check valve that does not permit flow from the outlet toward the inlet.

3. A flow device according to claim 1, wherein the means for biasing places the flow surfaces in close proximity, but under no bias toward one another, when there is no fluid flow.

4. A flow device according to claim 1, wherein pressure drop between the inlet and the outlet is substantially proportional to the fourth root of flow between the inlet and the outlet in the case of a fluid which is a liquid.

5. A flow device according to claim 1, wherein pressure drop between the inlet and the outlet is substantially proportional to the fifth root of flow between the inlet and the outlet in the case of a fluid which is a gas.

6. A flow device according to claim 1, wherein:
   said device further comprises an orifice which emits fluid through an aperture defined in one of the parallel flow surfaces; and
   the other of the substantially parallel flow surfaces is an impeder which is biased against the aperture, the impeder being displaced away from the aperture in response to pressure of flow emanating from the orifice.

7. A flow device according to claim 6, wherein the impeder has a middle region and a periphery, the middle region being biased against the aperture, a lateral flow channel being defined between the middle region and the periphery, to permit flow away from the aperture in response to displacement of the impeder.

8. A flow device according to claim 1, wherein said device is a passive flow restrictor, the parallel flow surfaces being displaced from one another solely in response to force exerted by the fluid against one of the flow surfaces.

9. A flow device according to claim 8, wherein the parallel flow surfaces are spring-biased against one another.

10. A flow device according to claim 8, wherein a spring biases the parallel flow surfaces against one another and the spring includes a conductive path having a strain gauge that varies a property of the conductive path in response to displacement between the flow surfaces.

11. A flow device according to claim 10, further comprising a measuring device, operatively coupled to the conductive path, which provides an indication of one of pressure drop and flow rate across the device, in direct response to variance in the property of the conductive path.

12. A flow device according to claim 1, further comprising at least one standoff bump, such that the flow surfaces do not have an extensive dimension of locally flat, sticking contact between them when there is no fluid flow.

13. A flow device according to claim 1, wherein the means for biasing is formed by a single flap that operates as a cantilever spring, to operatively connect the second flow surface to the first flow surface.

14. A flow device according to claim 1, wherein the means for biasing is formed by a plurality of springs that operatively connect the second flow surface to the first flow surface.

15. A flow device according to claim 1, wherein:

the flow surfaces are formed by first and second parallel disks;

the first parallel disk has a central aperture which receives fluid from the inlet and directs the fluid toward the second parallel disk; and one of the parallel disks has a periphery which defines an escape path that permits fluid to flow from the flow channel toward the outlet, the flow channel defined by a radially expanding path between the aperture and the periphery.

16. A flow device, comprising:

a first circular disk having a central aperture;

a second circular disk, parallel to the first circular disk and biased against displacement away from the first circular disk caused by fluid force;

wherein one of the circular disks has a periphery;

a fluid input that directs fluid through the aperture toward a central region of the second circular disk, to thereby displace the second circular disk against bias and widen a gap between the first and second circular disks in dependence upon force exerted by the fluid against the second circular disk, wherein the gap between the disks defines a flow channel; and an expanded flow channel formed at the periphery, which permits escape of fluid from the flow channel without significant resistance.

17. A flow device according to claim 16, wherein pressure drop between the inlet and the outlet is approximately proportional to the fourth root of liquid flow rate between the inlet and the outlet.

18. A flow device according to claim 16, wherein the first and second disks are made of stainless steel.

19. A flow device according to claim 16, wherein the first and second disks are made of silicon.

* * * * *